United States Patent [19]

Harding

[11] Patent Number: 4,823,901

[45] Date of Patent: Apr. 25, 1989

[54] APPARATUS AND METHOD FOR DETECTING FAULTS IN AN OBSTACLE DETECTION SYSTEM

[75] Inventor: Joseph J. Harding, Mentor, Ohio

[73] Assignee: Caterpillar Industrial Inc., Mentor, Ohio

[21] Appl. No.: 222,853

[22] Filed: Jul. 22, 1988

[51] Int. Cl.$^4$ ............................................... B60T 7/16
[52] U.S. Cl. ....................................... 180/167; 74/96; 250/221
[58] Field of Search .................... 180/167, 168, 169; 250/221, 222.1; 350/6.1; 74/42, 96, 105; 356/1, 4

[56] References Cited

U.S. PATENT DOCUMENTS 4,706,772  11/1987  Dawson et al. ..................... 180/167

Primary Examiner—Charles A. Marmor
Assistant Examiner—Richard Camby
Attorney, Agent, or Firm—Stephen L. Noe

[57] ABSTRACT

Industrial vehicles incorporating obstacle detection systems are commonly employed in commercial applications. Advantageously, such collision avoidance systems should incorporate failure detection systems sufficient to make such systems fail-safe. The subject obstacle detection system includes one or more transducers 24,24' adapted to produce article detected signals in response to sensing an obstacle in front of the vehicle 12. Preferably the transducers 24,24' are pivotally mounted to the vehicle 12. The transducers 24,24' are adapted to produce the article detected signals at regular predetermined intervals, and a sensor failed signal is produced in response to the transducers 24,24' ceasing to produce the article detected signal at such regular intervals. An end of detector swing signal is produced in response to the transducers 24,24' being at a predetermined angular swing position, and logic circuitry is adapted to receive the article detected signals and the end of detector swing signals and to produce an obstacle detected signal only in response to presence of the article detected signal coincident with absence of the end of detector swing signal.

13 Claims, 2 Drawing Sheets

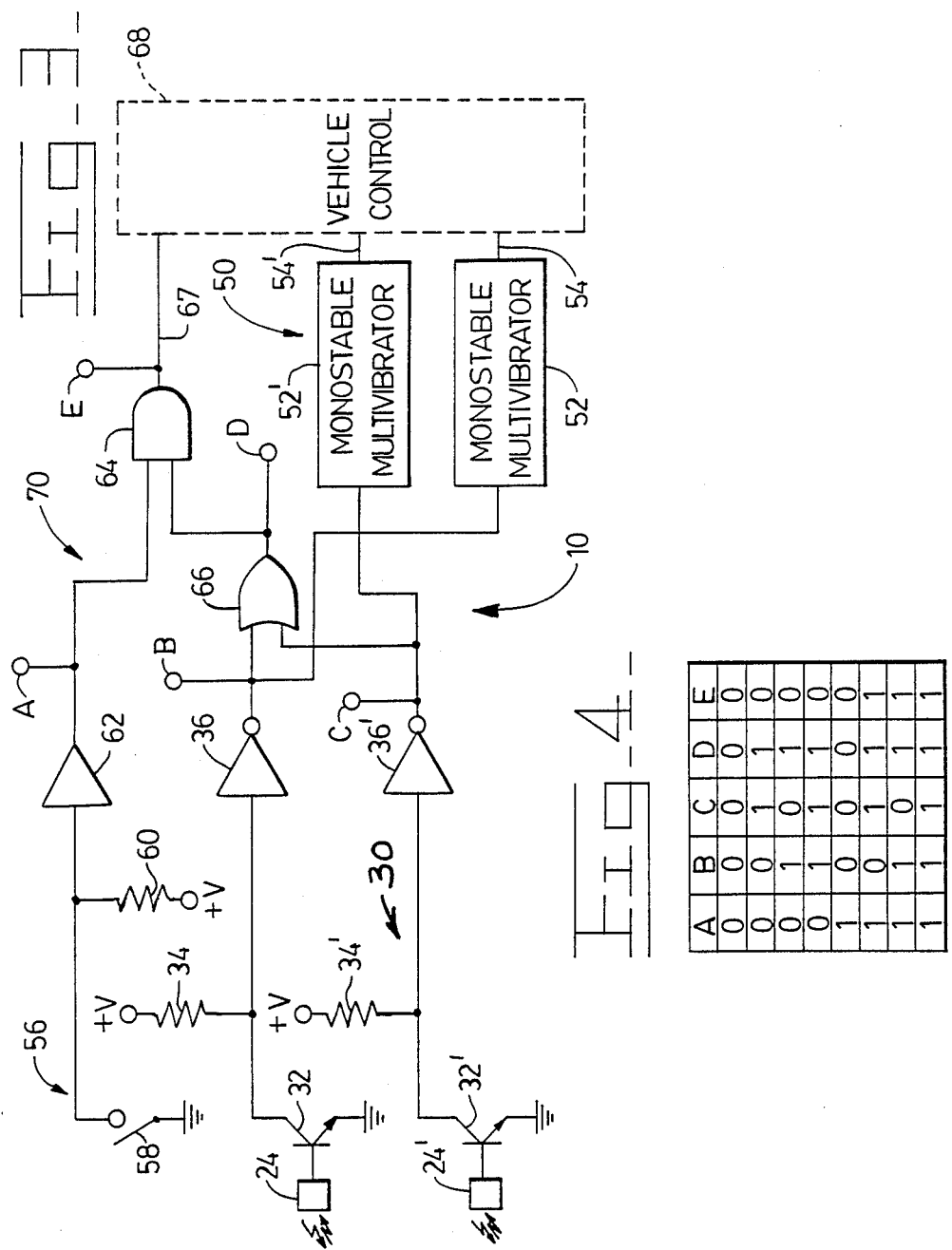

APPARATUS AND METHOD FOR DETECTING FAULTS IN AN OBSTACLE DETECTION SYSTEM

DESCRIPTION

Technical Field

This invention relates generally to an apparatus and method for detecting obstacles in the path of a work vehicle and, more particularly, to an apparatus and method for detecting faults in a system using one or more reciprocally mounted infrared transducers to detect obstacles in the path of a work vehicle.

Background Art

Work vehicles such as material handling vehicles, for example, industrial lift trucks, platform trucks, and self-guided vehicles, are commonly used to transport loads between spaced-apart locations in factories, warehouses, and the like. Often several work vehicles operate in the same general area, necessitating some sort of obstacle detection system to identify when another vehicle or other obstacle is in a travel path. Obstacle detection is particularly important when the work vehicle is of the driverless type.

One example of an obstacle detection system is set forth in U.S. Pat. No. 4,706,772 issued Nov. 17, 1987 to Ian J. Dawson, et al. The Dawson patent teaches the use of dual infrared-type scanners mounted on an oscillating or reciprocating mechanism at the front of a work vehicle. The system continuously scans a path sufficiently far in front of the vehicle to permit appropriate control of the vehicle in the event that an obstacle is detected. Although each infrared scanner incorporates a relatively narrow infrared scanning beam, the reciprocating action allows two scanners to completely cover the area in front of the vehicle.

Although the system set forth in Dawson is quite effective, it does not account for the possibility that one or more of the transducers will cease operating properly or that the reciprocating motion will be interrupted. In such event, the sensor system will be rendered inoperative, at least in certain locations in front of the vehicle.

The present invention is directed to overcoming one or more of the problems as set forth above.

Disclosure of the Invention

In one aspect of the present invention, an apparatus for detecting obstacles in the path of a work vehicle is mounted upon the vehicle. A transducer is provided for producing radiant energy, receiving reflected produced radiant energy, and controllably producing an article detected signal in response to receiving the reflected produced radiant energy. The transducer is pivotally mounted to the work vehicle. An element is positioned at a location sufficient to cause the transducer to produce the article detected signal at regular predetermined intervals. The article detected signal is received by an apparatus which produces a sensor failed signal in response to the transducer ceasing to produce the article detected signal at the regular predetermined intervals. An end of detector swing signal is also produced in response to the transducer being at a predetermined angular swing position. A logic circuit is provided for receiving the article detected signals and end of detector swing signals and producing an obstacle detected signal in response to presence of the article detected signal coincident with absence of the end of detector swing signal.

In a second aspect of the present invention, a method of detecting obstacles in the path of a work vehicle is provided. The work vehicle includes an obstacle detection apparatus mounted thereon, the obstacle detection apparatus including a transducer pivotally mounted to the work vehicle. The method comprises the steps of causing the transducer to produce radiant energy, responsively receive reflected produced radiant energy, and controllably produce an article detected signal in response to receiving the reflected produced radiant energy. The transducer is also caused to produce the article detected signal at regular predetermined intervals. The article detected signal is received and a sensor failed signal is produced in response to the transducer ceasing to produce the article detected signal at the regular predetermined intervals. An end of detector swing signal is produced in response to the transducer being at a predetermined angular swing position. The produced article detected signals and end of detector swing signals are received and produce an obstacle detected signal in response to presence of the article detected signal coincident with absence of the end of detector swing signal.

The present invention provides an obstacle detection system that is advantageously failsafe with respect to failure of either the transducer unit or units or of the linkage and motor apparatus for reciprocally moving such transducer or transducers.

BRIEF DESCRIPTION OF THE DRAWINGS

FIG. 3 is a schematic representation of the circuitry incorporated in one embodiment of the present invention; and FIG. 4 is a logic truth table referencing various signals identified on FIG. 3.

BEST MODE FOR CARRYING OUT THE INVENTION

Figure 1:
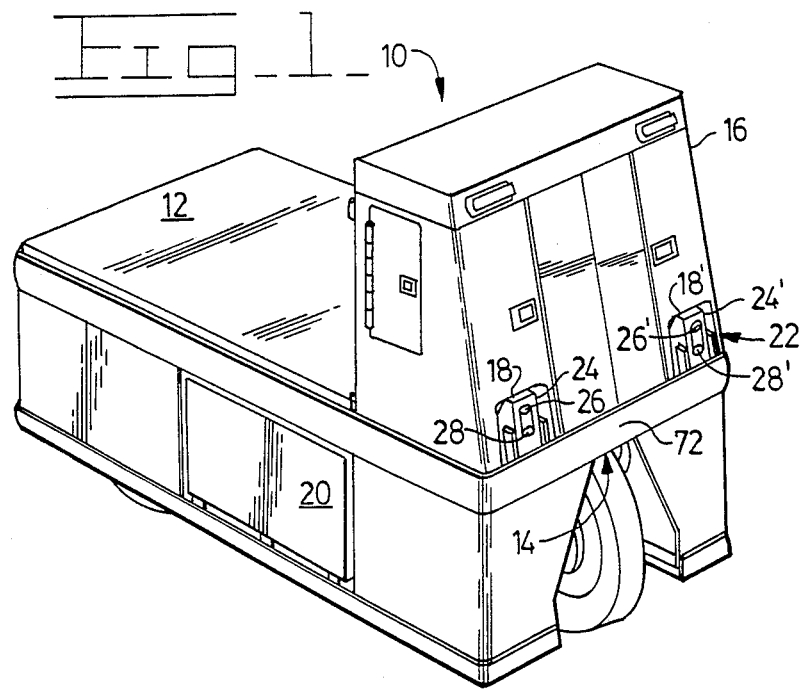
FIG. 1 is a diagrammatic isometric view of one embodiment of the present invention showing a work vehicle and an oscillating transducer assembly pivotally mounted on the frame of the vehicle.
Figure 2:
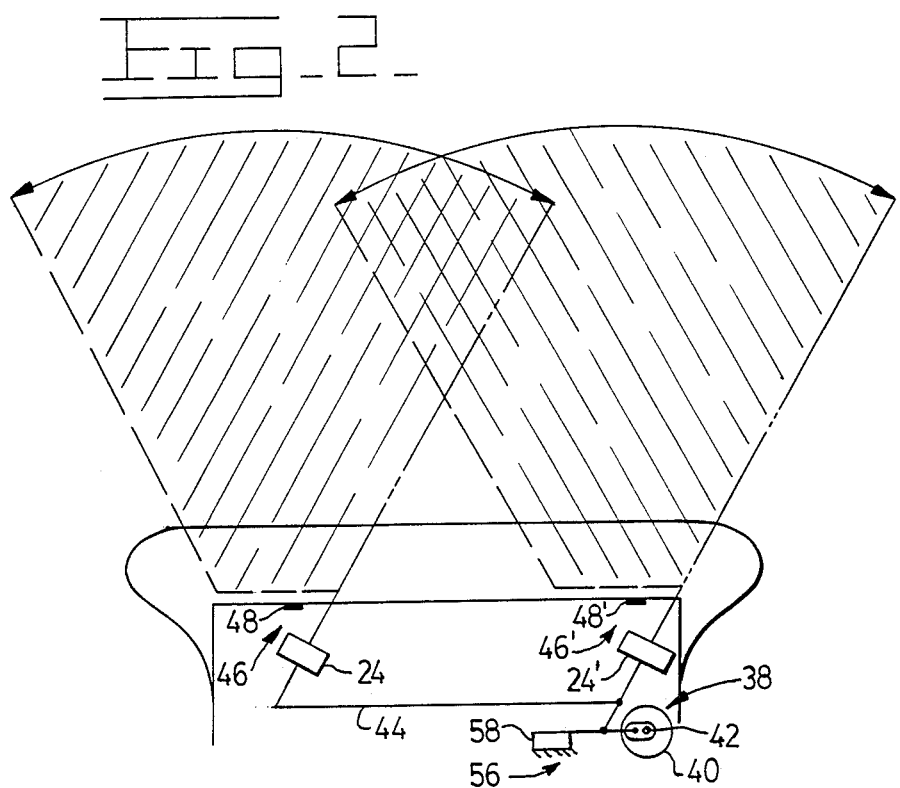
FIG. 2 is a simplified top diagrammatic view of an embodiment of an obstacle detection system incorporating dual transducers pivotally linked to a motor mechanism.

Referring first to FIG. 1, an apparatus embodying certain of the principles of the present invention is generally indicated by the reference numeral 10. The following detailed description relates to the best presently known embodiment of the apparatus 10. However, the apparatus 10 can assume numerous other embodiments, as will become apparent to those skilled in the art, without departing from the appended claims.

A work vehicle 12 has a frame 14 and a tower portion 16 extending upwardly from the frame 14. A pair of openings 18,18' is disposed in the tower portion 16 facing forwardly of the work vehicle 12. A source of electrical energy in the form of a storage battery 20 supplies electrical energy requirements of the work vehicle 12. An oscillating transducer arrangement 22 having first and second spaced apart transducers 24,24' is provided for identifying an object in the path of the work vehicle 12. Each transducer 24,24' is disposed in one of the openings 18,18' in the tower portion 16.

Each of the transducers 24,24' includes a transmitting portion 26,26' and a corresponding receiving portion 28,28'. Each transmitting portion 26,26' is adapted to deliver an optical signal which has a relatively narrow beam. Each receiving portion 28,28' is adapted to receive a reflected portion of such optical signal and to responsively produce a digital logic signal. The transducers 24,24' may be, for example, of the type manufactured by Visolux, as Model LT2000 reflection light scanners. Such scanners are self-contained, focused beam, photoelectric controls which are adapted to detect all objects, regardless of texture and color, within a scanned field. The units transmit a beam of modulated infrared light and receive portions of such transmitted light reflected by objects within the scanned field.

Referring now to the remaining figures, the apparatus 10 includes transducer means 30, for producing radiant energy, receiving reflected produced radiant energy, and controllably producing an article detected signal in response to receiving the reflected produced radiant energy. The transducer means 30 include the transducers 24,24' which are pivotally mounted to the work vehicle 12. First and second transistors 32,32' are connected through respective pull-up resistors 34,34' to a voltage source and to circuit ground. An input terminal of each of the first and second transistors 32,32' is connected to a respective one of the transducers 24,24', and an output terminal of each of the transistors 32,32' is connected to a respective buffer/inverter 36,36'.

Motive means 38 reciprocally pivots the transducers 24,24' through a predetermined angle. In a typical embodiment, the motive means 38 includes a motor 40 having a cam mechanism 42. The cam mechanism 42 reciprocally drives a linkage 44 which is in turn connected to the transducer means 30. In response to rotation of the motor 40 the linkage 44 drives the transducers 24,24' in a reciprocal angular motion in a manner similar to a windshield wiper mechanism on a typical passenger car.

Means 46,46' is also provided for causing the transducer means 30 to produce the article detected signal at regular predetermined intervals. The causing means 46,46' includes, for example, reference objects 48,48' mounted to the work vehicle 12 in fixed positions in front of respective transducers 24,24'. Owing to the location of the respective reference objects 48,48', the corresponding transducer 24,24' is caused to produce the article detected signal in response to the transducer 24,24' being at a predetermined angular swing position relative to the vehicle frame 14. Owing to the narrow beam width of the optical energy delivered by the transducers 24,24', each reference object 48,48' reflects the optical energy only at one particular position of the respective transducer 24,24' swing. Therefore, the reference object 48,48' appears as a detected target or object only during a small, predetermined portion of the entire reciprocal cycle of each transducer 24,24'.

Means 50 is provided for receiving the article detected signal and producing a sensor-failed signal in response to the transducer means 30 ceasing to produce the article detected signal at the regular predetermined intervals. The receiving means 50 includes first and second respective retriggerable monostable multivibrators 52,52'. Each of the multivibrators 52,52', is connected to a respective one of the buffer/inverters 36,36'. The multivibrators 52,52' are constructed such that a transition from a logic "zero" to a logic "one" at the respective input terminals of the multivibrators 52,52', i.e., produced by the respective buffer/inverter 36,36', causes the respective multivibrator 52,52' to be reset. In the reset condition, the respective output line 54,54' from the multivibrator 52,52' is at a logic "one" state. So long as each multivibrator 52,52' is periodically reset at intervals less than the time constant associated with the particular multivibrator 52,52', the output line 54,54' remains at a logic "one" level. In the event that a reset pulse is not applied to a multivibrator 52,52' within such time period, the corresponding output line 54,54' changes to a logic "zero" level. The monostable multivibrators 52,52' are, for example, of a construction similar to that supplied by Motorola, Inc. as part number MC14538B.

Means 56 is also provided for producing an end of detector swing signal in response to the transducer means 30 being at a predetermined angular swing position. The means 56 for producing an end of detector swing signal includes a switch 58 actuatable by the motive means 38. The switch 58 has a first element connected to circuit ground and a second element connected through a pull-up resistor 60 to a voltage source. The switch 58 is also connected to the input terminal of a buffer 62. An output terminal of the buffer 62 is connected to a first input terminal of an AND gate 64.

Output terminals of the buffer inverters 36,36' are connected to respective first and second input terminals of an OR gate 66. The output terminal from the OR gate 66 is in turn connected to the remaining input terminal of the AND gate 64. An output line 67 from the AND gate 64, and the output lines 54,54' from the multivibrators 52,52', are all connected to respective input terminals on a vehicle control logic system 68. The vehicle control logic system 68 does not form a part of the instant invention but is the general vehicle control for the work vehicle 12 of the type described herein. The combination of buffer 62, inverted buffers 36,36', OR gate 66 and AND gate 64 comprise logic means 70 for receiving the produced article detected signals and end of detector swing signals and producing an obstacle detected signal in response to presence of the article detected signal coincident with absence of the end of detector swing signal.

It will be appreciated by those skilled in the art that, although the preferred embodiment of the instant invention incorporates two transducers 24,24' and associated duplicative components as described above, the scope of the instant application is by no means limited to such single embodiment. It would be a simple matter for one skilled in the art to utilize the instant invention using only a single transducer by merely eliminating those components designated as "prime" throughout the above discussion, and by also eliminating the OR gate 66. Conversely, more than two transducers could easily be accommodated by adding duplicative components as described above and by using an OR gate having additional input terminals. Such basic modifications to the invention described herein are intended to be covered by the appended claims.

Industrial Applicability

Operation of the apparatus 10 is best described in relation to its use on a vehicle such as the work vehicle 12. In operation, electrical current is delivered from the battery 20 to the transducers 24,24' and to the electric motor 40. Such current causes the transmitting portions 26,26' of the transducers 24,24' to deliver an optical signal having an intense beam of narrow width from the vehicle 12 in a direction generally in the path of movement of the vehicle 12. The electrical current also activates the receiving portions 28,28' of the transducers 24,24' and causes the various electronic elements of the apparatus 10 to become active. The speed of rotation of the electric motor 40 is selected as a function of the width and the travel speed of the vehicle, and the scanning range of the transducers 24,24'. In a typical application the desired range of the light signal is, for example, in the vicinity of 2 meters (6.5 ft.).

Rotation of the motor shaft is converted to reciprocal or oscillating motion by the cam mechanism 42 and the linkage 44 and is delivered to the transducers 24,24'. Preferably, the amount of reciprocal motion of each transducer 24,24' enables the optical beam from that transducer 24,24' to cover an area equal to at least one-half the area to be scanned in front of the vehicle 12. The oscillating scanning arrangement provides a unique, low cost, efficient and accurate manner of detecting objects in the path of movement of the vehicle 12.

Reference to the logic state table exhibited in FIG. 4 will be helpful in understanding the following circuit discussion. Assuming first that no obstacle is detected by the transducers 24,24', and that the transducers 24,24' are not at the end of swing position, the corresponding signals delivered at the test points labeled A, B and C in FIG. 3 are respectively at logic levels "one", "zero", "zero". Responsively, the logic signal delivered on the line 67 from the AND gate 64 is "zero", indicating that no obstacle is detected. In the event that the end of swing signal is produced by closure of the switch 58 in response to the linkage 44 obtaining a preselected angular relationship to the vehicle 12, the logic signal at test point A becomes "zero". The logic "zero" signal is delivered to a first input terminal of the AND gate 64, and the output of the AND gate 64 on the line 67 will be logic "zero" regardless of the status of the other AND gate 64 input terminal. In other words, for a brief period at the end of each reciprocal swing cycle the obstacle detected signal is blocked from being delivered to the vehicle control 68 in order to eliminate undesired vehicle control action caused by detection of the reference objects 48,48'.

Assuming that no other obstacle is detected by the transducers 24,24', once each cycle respective ones of the reference objects 48,48' are detected by the associated transducer 24,24', causing a logic "one" signal to be delivered both to the OR gate 66 and to the respective monostable multivibrator 52,52'. Therefore, so long as the transducers 24,24' continue to operate properly, and so long as the transducers 24,24' continue to reciprocate, a logic signal rising from a logic state "zero" to a logic state "one" is delivered at regular predetermined intervals to each of the monostable multivibrators 52,52'. The rising edge of the logic signal resets the monostable multivibrators 52,52' causing a logic "one" to be delivered to the respective output lines 54,54'.

The time period of the monostable multivibrators 52,52' is preferably selected such that it is slightly longer than the longest expected reciprocal cycle time for rotation of the transducers 24,24'. Therefore, so long as the transducers 24,24' and the motive means 38 continue to operate properly, the multivibrators 52,52' are always periodically reset prior to expiration of the time period and the signal delivered on the lines 54,54' to the vehicle control 68 is always a logic "one".

In response to detecting something other than a logic "one" on either of the lines 54,54', the vehicle control 68 is preferably designed or programmed to take whatever action is appropriate under such circumstances. In a preferred embodiment, the vehicle control 68 would automatically place the vehicle 12 in a slow speed mode such that a hard wired stop system incorporated in a bumper 72 of the vehicle 12 could adequately protect the vehicle 12 and associated obstacles from damage. The vehicle control 68 could take other actions, for example, notifying a central control unit by radio link of the detected fault, displaying the detected fault on a diagnostic indicator panel of some nature, etc.

In all cases, the article detected signals are delivered from the transducers 24,24' through the OR gate 66 to the AND gate 64. So long as the end of detector swing signal from the switch 58 is not coincidentally present with the article detected signals at the AND gate 64, the resulting obstacle detected signals are delivered on the line 67 to the vehicle control 68 for appropriate obstacle avoidance action. Owing to the fact that the reference objects 48,48' are positioned in front of the transducers 24,24' at locations such that they will be detected by the respective transducers 24,24' only coincidentally with the end of swing signal produced by the switch 58, actual obstacles detected in the path of the vehicle 12 cause obstacle detected signals to be delivered on the line 67 to the vehicle control 68, but the article detected signals caused by the reference objects 48,48' are blocked from being passed on to the vehicle control 68.

Failure of either the motive means 38 or the linkage 44 causes the transducers 24,24', to stop reciprocating. Assuming that no obstacle is being detected by the transducers 24,24', the reset pulse is not be applied to the multivibrators 52,52' and, upon time out of the multivibrators 52,52', fault signals are delivered on the output lines 54,54'.

In the unlikely event that reciprocal motion fails at the precise angle wherein the reference objects 48,48' are being detected, the same result obtains owing to the fact that, although a logic "one" signal is constantly delivered to the inputs of the multivibrators 52,52', reset occurs only on the rising edge of the logic "one" signal and the signal in this case is static. Therefore, again the fault signal is delivered by the multivibrators 52,52' to the vehicle control 68. In the event that reciprocal motion continues and that one or both of the transducers 24,24' fails, the change in logic state of the signal delivered to the respective multivibrator 52,52' from the affected transducer 24,24' does not occur as expected and, again, the fault signal is delivered on the appropriate output line 54,54' to the vehicle control 68. Therefore, in all cases the fault is detected and appropriate action taken.

The instant apparatus provides all of the advantages of infrared obstacle detection coupled with the further advantages of fail-safe operation of the obstacle detection system. The system reliably detects failures in the transducers 24,24', in the motive means 38 and in the linkage 44. Regardless of the source of fault, the fault is detected and delivered on one of the lines 54,54' to the vehicle control 68.

Other aspects, objects, advantages and uses of this invention can be obtained from a study of the drawings, the disclosure, and the appended claims.

I claim:

1. Apparatus for detecting obstacles in the path of a work vehicle upon which said apparatus is mounted, comprising:
   transducer means for producing radiant energy, receiving reflected produced radiant energy, and controllably producing an article detected signal in response to receiving said reflected produced radiant energy, said transducer means being pivotally mounted to said work vehicle;
   means for causing said transducer means to produce the article detected signal at regular predetermined intervals;
   means for receiving the article detected signal and producing a sensor failed signal in response to said transducer means ceasing to produce the article detected signal at said regular predetermined intervals;
   means for producing an end of detector swing signal in response to said transducer means being at a predetermined angular swing position; and
   logic means for receiving the produced article detected signals and end of detector swing signals and producing an obstacle detected signal only in response to the presence of the article detected signal coincident with the absence of the end of detector swing signal.

2. Apparatus, as set forth in claim 1, including motive means for reciprocally pivoting said transducer means through a predetermined angle.

3. Apparatus, as set forth in claim 2, wherein said means for producing an end of detector swing signal includes a switch actuatable by said motive means.

4. Apparatus, as set forth in claim 2, wherein said means for causing said transducer means to produce the article detected signal at regular predetermined intervals is located at said predetermined angular swing position.

5. Apparatus, as set forth in claim 4, wherein said means for causing said transducer means to produce the article detected signal at regular predetermined intervals includes a reference object mounted to said work vehicle in a fixed position in front of said transducer means.

6. Apparatus, as set forth in claim 1, wherein said logic means includes an AND gate having a first input terminal responsively connected to said transducer means and a second input terminal responsively connected to said means for producing the end of detector swing signal.

7. Apparatus, as set forth in claim 1, wherein said means for receiving the article detected signal and producing a sensor failed signal includes a retriggerable monostable multivibrator.

8. A work vehicle, comprising:
   a vehicle frame;
   transducer means for producing radiant energy, receiving reflected produced radiant energy, and controllably producing an article detected signal in response to receiving said reflected produced radiant energy, said transducer means being pivotally mounted to said vehicle frame;
   means for causing said transducer means to produce the article detected signal at regular predetermined intervals, said causing means including an object mounted to said work vehicle in a fixed position in front of said transducer means;
   means for receiving the article detected signal and producing a sensor failed signal in response to said transducer means ceasing to produce the article detected signal at said regular predetermined intervals;
   motive means for reciprocally pivoting said transducer means through a predetermined angle;
   means for producing an end of detector swing signal in response to said transducer means being at a predetermined angular swing position, said producing means including a switch actuatable by said motive means; and
   logic means for receiving the produced article detected signals and end of detector swing signals and producing an obstacle detected signal only in response to the presence of the article detected signal coincident with the absence of the end of detector signal.

9. A work vehicle, as set forth in claim 8, wherein said means for causing said transducer means to produce the article detected signal at regular predetermined intervals is located at said predetermined angular swing position.

10. A work vehicle, as set forth in claim 9, wherein said logic means includes an AND gate having a first input terminal responsively connected to said transducer means and a second input terminal responsively connected to said means for producing the end of detector swing signal.

11. A work vehicle, as set forth in claim 10, wherein said means for receiving the article includes a retriggerable monostable multivibrator.

12. A method for detecting obstacles in the path of a work vehicle, said work vehicle including obstacle detection apparatus mounted thereon, said obstacle detection apparatus including transducer means pivotally mounted to said work vehicle, the method comprising:
   causing said transducer means to produce radiant energy, responsively receive reflected produced radiant energy, and controllably produce an article detected signal in response to receiving said reflected produced radiant energy;
   causing said transducer means to produce the article detected signal at regular predetermined intervals;
   receiving the article detected signal and producing a sensor failed signal in response to said transducer means ceasing to produce the article detected signal at said regular predetermined intervals;
   producing an end of detector swing signal in response to said transducer means being at a predetermined angular swing position; and
   receiving the produced article detected signals and end of detector swing signals and producing an obstacle detected signal only in response to the presence of the article detected signal coincident with the absence of the end of detector signal.

13. The method of claim 12, including causing said transducer means to produce the article detected signal in response to said transducer means being at said predetermined angular swing position.

* * * * *

UNITED STATES PATENT AND TRADEMARK OFFICE
CERTIFICATE OF CORRECTION

PATENT NO. : 4,823,901

DATED : April 25, 1989

INVENTOR(S) : JOSEPH F. HARDING

It is certified that error appears in the above-identified patent and that said Letters Patent is hereby corrected as shown below:

Claim 11, line 2 (column 8, line 33), after "article" insert
--detected signal and producing a sensor failed signal--.

Signed and Sealed this

Sixteenth Day of January, 1990

Attest:

JEFFREY M. SAMUELS

Attesting Officer     Acting Commissioner of Patents and Trademarks